(No Model.) 4 Sheets—Sheet 1.
L. J. WOHNLICH.
MACHINE FOR CUTTING EXCELSIOR.
No. 513,853. Patented Jan. 30, 1894.
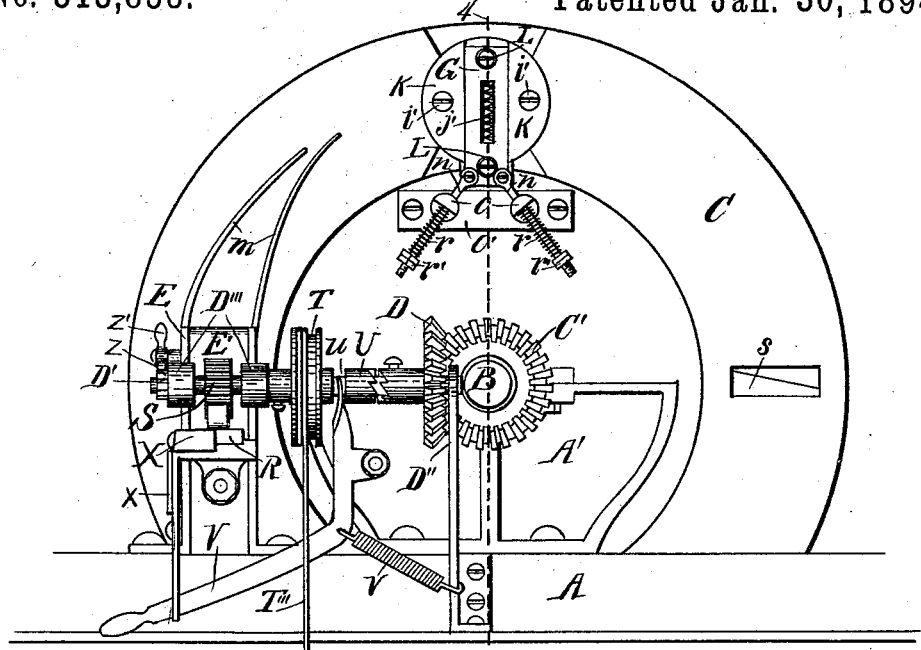
Fig. 1.
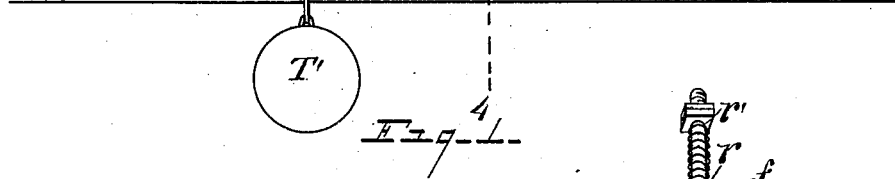
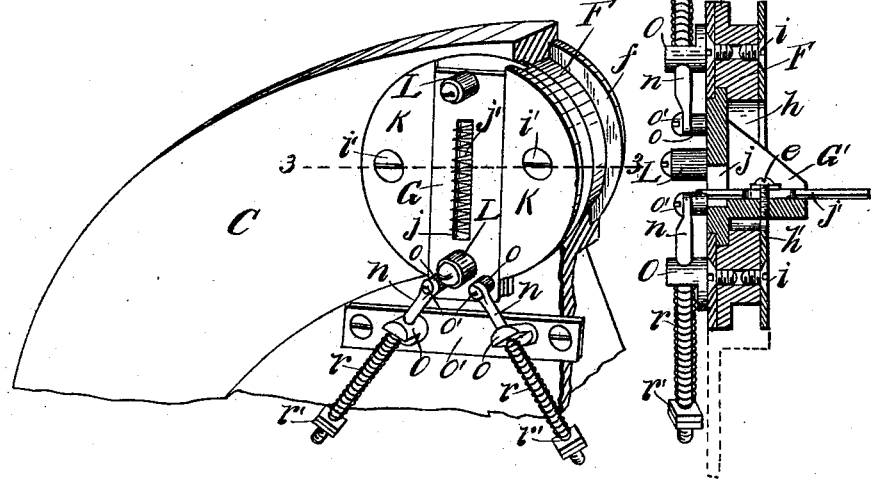
Fig. 2.  Fig. 3.
WITNESSES
B. P. Wheeler
H. P. Wheeler
INVENTOR
Louis J. Wohnlich
By Edgar S. Wheeler,
Attorney.

(No Model.) 4 Sheets—Sheet 2.
L. J. WOHNLICH.
MACHINE FOR CUTTING EXCELSIOR.
No. 513,853. Patented Jan. 30, 1894.
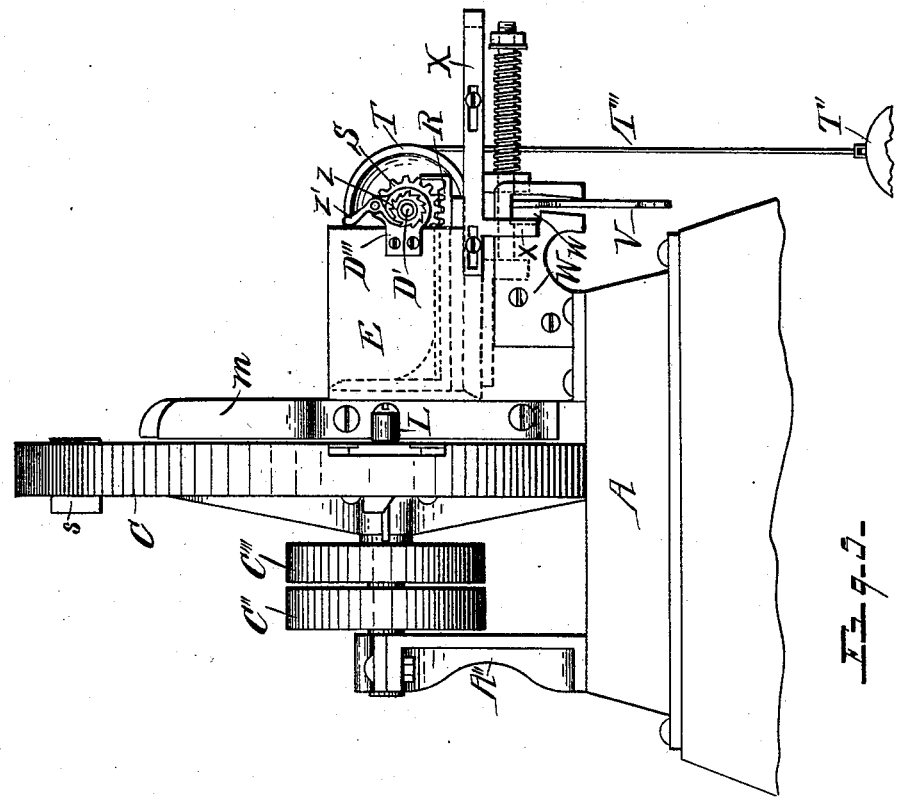
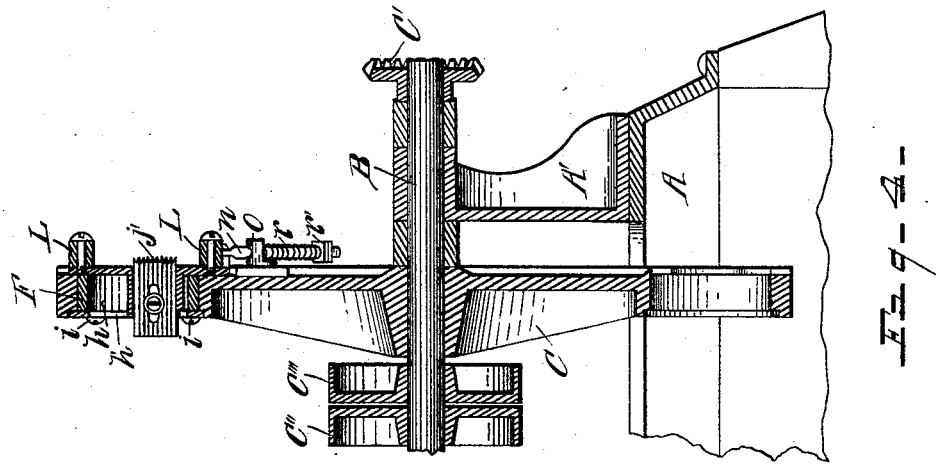

(No Model.) 4 Sheets—Sheet 3.
L. J. WOHNLICH.
MACHINE FOR CUTTING EXCELSIOR.
No. 513,853. Patented Jan. 30, 1894.
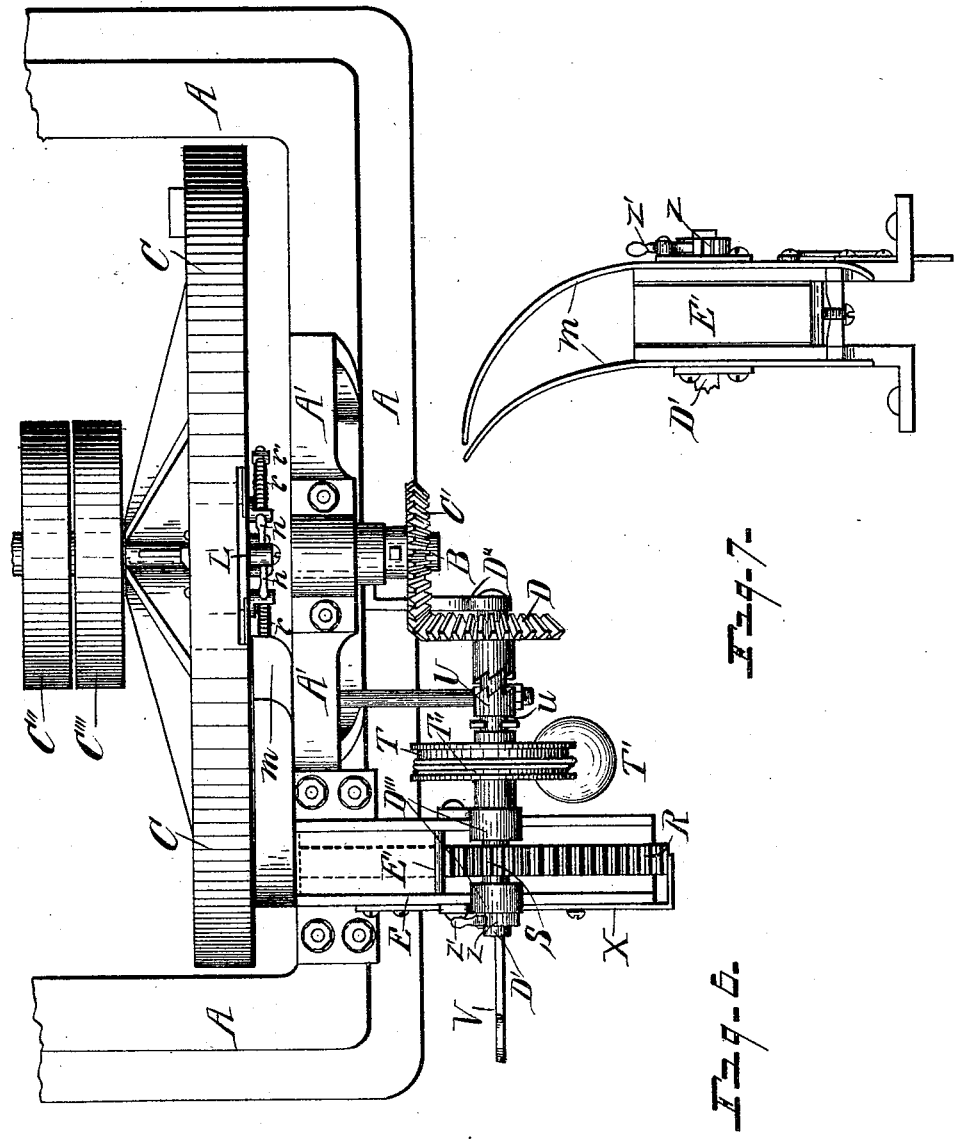
WITNESSES
B. A. Wheeler
H. R. Wheeler
INVENTOR
Louis J. Wohnlich
By Edgar S. Wheeler
Attorney.

(No Model.)　　　　　　　　　　　　　　　　　4 Sheets—Sheet 4.
L. J. WOHNLICH.
MACHINE FOR CUTTING EXCELSIOR.
No. 513,853.　　　　　　　　　　　Patented Jan. 30, 1894.
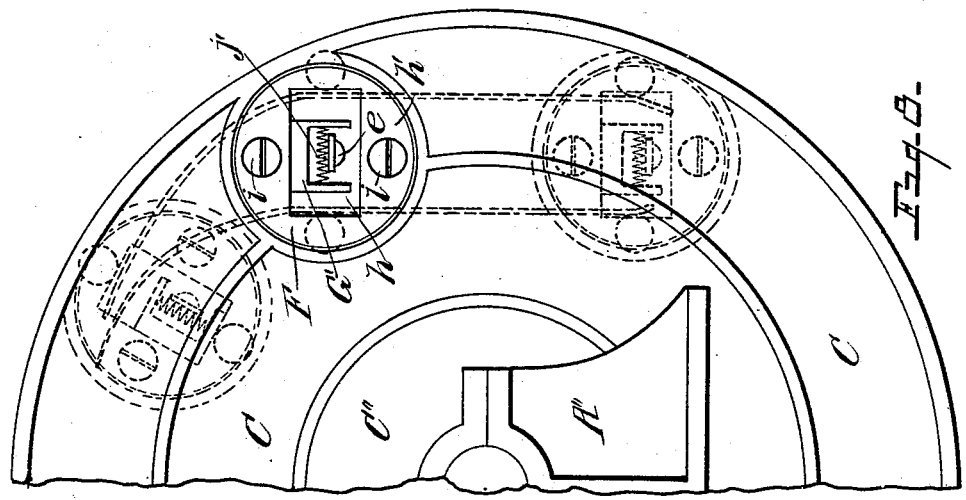
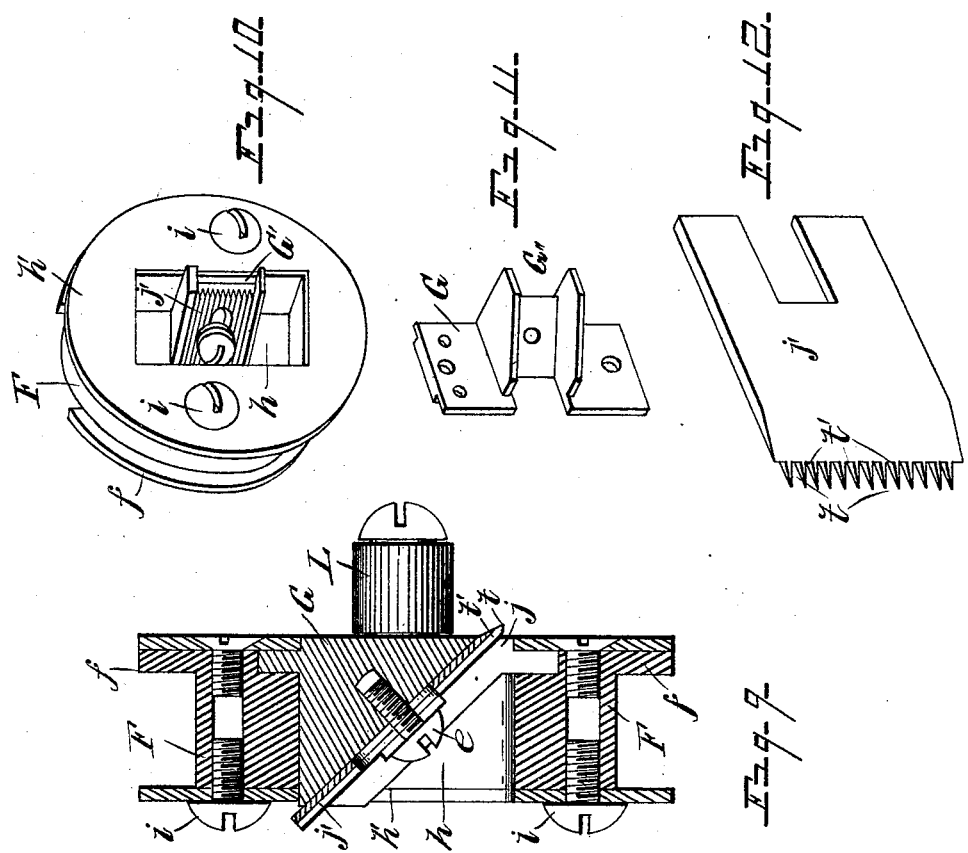
WITNESSES　　　　　　　　　　　　　　INVENTOR
　　　　　　　　　　　　　　　　　　Louis J. Wohnlich
　　　　　　　　　　　　　　　　By Edgar S. Wheeler
　　　　　　　　　　　　　　　　　　　Attorney.

UNITED STATES PATENT OFFICE.

LOUIS J. WOHNLICH, OF DETROIT, MICHIGAN, ASSIGNOR TO JAMES R. BATE, OF CINCINNATI, OHIO.

MACHINE FOR CUTTING EXCELSIOR.

SPECIFICATION forming part of Letters Patent No. 513,853, dated January 30, 1894.

Application filed December 3, 1892. Serial No. 453,973. (No model.)

*To all whom it may concern:*

Be it known that I, LOUIS J. WOHNLICH, a citizen of the United States, residing at Detroit, in the county of Wayne and State of Michigan, have invented certain new and useful Improvements in Machines for Cutting Excelsior; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to new and useful improvements in machines for cutting excelsior, and consists in a certain construction and arrangement of parts, as hereinafter fully set forth, the essential features of which being pointed out particularly in the claims.

The object of this invention is to provide means in a rotary machine for controlling the marking spurs or scorers, whereby an oscillating and reciprocating motion is imparted to said scorers, at the point of engagement with the block, to direct them from a line corresponding with the radii of the wheel, to a horizontal line therewith, in which position they are deflected from the arc of a circle described by said wheel and caused to travel in a straight vertical plane across the face of the block from which the excelsior is cut, said scorers remaining in a horizontal position, while in service, throughout the length of the block, thereby obviating the twisting of the scorers in the block which produces rough ragged strands of excelsior, incident to machines of this class wherein said scorers are fixed on a radial line with the axis of the wheel and adapted to reciprocate only in such direction, and to further provide for controlling mechanically the feed device, whereby the blocks may be automatically fed to the machines. These objects are attained and the objections overcome by the employment of the mechanism illustrated in the accompanying drawings, in which—

Figure 1 is a front elevation of my improved machine. Fig. 2 is a detail, in perspective, of the mechanism for controlling the scorers. Fig. 3 is a section on line 3—3 of Fig. 2, inverted. Fig. 4 is a central vertical section through the wheel on line 4—4 of Fig. 1. Fig. 5 is an end elevation of the machine, looking to the right. Fig. 6 is a top plan of the machine. Fig. 7 is a rear elevation of the block feeding receptacle. Fig. 8 is a rear elevation of a portion of the wheel, showing by dotted lines the position of the block receptacle. Fig. 9 is a central vertical section through the mechanism controlling the scorers, showing a modified form of scoring blade and manner of mounting same. Fig. 10 is a rear perspective of same. Fig. 11 is a perspective of the reciprocating plate to which the scorers are attached. Fig. 12 is a perspective of the modification of scoring blade.

Referring to the letters of reference, A indicates a suitable base having mounted thereon the pedestals A' A'', in which is journaled in suitable bearings the main shaft B, and fixed upon said shaft is the cutting-wheel C, the beveled gear-wheel C', and the loose and tight belt pulleys C'', C''', respectively; through the medium of the latter, said cutting wheel and beveled gears are driven; and meshing with the gear C' is a like gear D loosely mounted on the counter shaft D', which shaft extends at right angle to the main shaft B, and is journaled in the bearing D'' on the frame, and bearings D''', on the feed-box E, by means of which the feeding mechanism is controlled, as will be hereinafter more fully explained.

Heretofore in rotary machines of this class the marking spurs or slitters have been located in the cutting wheel on a fixed line with the radius of said wheel, and arranged to reciprocate diametrically therein to deflect them from the arc of the circle described by said wheel, the slitters remaining on such radial line while traveling across the face of the block, whereby the cutting edges of said slitters are caused to turn in ratio to the arc of the circle described by the wheel, thus deflecting the edges and bringing into service the side portions thereof when entering and leaving the block. This renders the strands ragged and brittle and produces undue friction of the parts.

In my present device the above objection is entirely overcome by the mechanism, more clearly shown in Figs. 2 and 3, in which F is a circular head having the right angle flange $f$ on one side thereof, and provided with the rectangular opening $h$ centrally therethrough. The reduced or body portion of the plate F is placed through a circular opening formed in the wheel near the perimeter thereof, and is adapted to oscillate therein, being held from disengagement therewith by means of the flange $f$ and face-plate $h'$ which is secured to the back of the plate F by means of the screws $i$ that pass therethrough into said head. See Figs. 2, 3, and 9.

G is the sliding chair having the aperture $j$ therein for the reception of the cutting ends of the slitters $j'$, the body portions of which are secured by means of the set screws $e$, to the rearwardly projecting base $G'$ of said chair, which chair is seated in the face of the head F, and adapted to reciprocate therein, being held in position by the overlapping edges of the plates $k$, $k$, that are secured by the screws $i'$ to the face of the head F. Mounted on the face of the sliding chair G, at the ends thereof, are the anti-friction rollers L, L that are adapted to engage the sides of the inwardly curved arms $m$ of the feed-box E to oscillate said head and cause said slitters to stand horizontally parallel with said feed-box when brought into contact with the block to be scored. See Fig. 8.

$n$, $n$ are arms pivotally secured to the inner end of the sliding chair G, by means of the pins $o$, $o$ and screws $o'$ $o'$, as shown in Figs. 2 and 3. Said arms are located on a tangent to the head F, and are movably supported in the studs O, O that are swiveled in the plate O' attached to the face of the wheel C, and carry on their rear ends the coiled springs $r$, $r$ that are interposed between the studs O and the lock nuts $r'$ on the ends of said arms, whereby the sliding chair G is held against centrifugal force, and tangential tension is applied to the head F, (when oscillated by the action of the rollers L, L) to restore said head to its normal position. See Fig. 2.

By referring to the dotted positions of Fig. 8, it will be seen that the slitters $j'$ when approaching the curved arms $m$ of the feed box, stand on a radial or diametrical line with the cutting wheel; and that as the rollers L engage the sides of said arms, the slitters are diverted to a line horizontally parallel to the feed-box and are retained in such position by continuous contact of said rollers with the parallel extensions of the curved arms $m$ (which coincide with the vertical sides of the feed-box) but are permitted to deviate from the arc of the circle described by the wheel, by the longitudinal reciprocation of the chair G, and travel in a straight vertical plane until disengaged from the block, when by the action of the springs $r$, the parts will assume their former position.

$s$ is a knife located in the wheel with its cutting edge projecting slightly from the face thereof, and is adapted to travel in the path of the slitters and remove the strands from the block. This however may be dispensed with, as I have shown in Figs. 9, 10, 11 and 12 means in connection with the slitters to accomplish this result, in which $j'$ represents the slitter blade having the acuminated scoring points $t$ formed thereon in the usual manner. The back face of said blade adjacent to said points is ground or beveled on a suitable angle to form the cutting edges $t'$ between the scoring points, as clearly shown in Fig. 12. Said blade being mounted on the inclined base $G''$ of the chair G, presents the scoring points $t$ of said blade in advance of the cutting edges $t'$, as shown in Fig. 9, whereby (there being a series of such blades in the wheel) each succeeding blade will remove the strands scored by the preceding blade, and at the same time score the block for the next succeeding blade, thus dispensing entirely with the stationary knives, and permitting the space occupied thereby to be utilized for the scoring blades, whereby the capacity of the machine is greatly increased.

The bolts or blocks from which the excelsior is cut, are placed within the feed-box E, being forced against the face of the cutting wheel by means of the sliding head or follower E', which is provided with the rack R, that meshes with the gear-wheel S, on the shaft D', said shaft carrying also the fixed grooved pulley T, with the weight T' and cable T'' wound thereon, see Figs. 1 and 6, whereby by the gravity of said weight the shaft and gear are revolved and the rack and follower driven to force the block against the wheel, and to raise the weight and restore said follower to enable the refilling of the feed-box, the sliding clutch U, splined on the shaft D' is thrown into engagement with the hub of the loose gear D, by means of the hand lever V, which is suitably pivoted on the frame and provided with the coiled spring $v$ connected therewith and with the frame. The upper end of said lever is bifurcated and engages with an annular recess $u$ formed in said clutch. Its opposite end is engaged with the shoulder $w$ of the bracket W on the feed-box, and is held in engagement therewith by the tension of the coiled spring $v$, whereby the gear D is caused to drive the shaft D' in a reverse direction to that produced by the weight and cable, thus raising said weight and withdrawing the follower, the rear end of which, as it recedes, engages with the sliding bar X having the depending arm $x$ thereon that is brought in contact with the lever V, and trips or disengages said lever from the shoulder $w$, allowing said lever by the action of the spring to disengage the clutch U and free the shaft D' from the gear D thus allowing the weight to again drive the shaft and force the follower forward, but to prevent said follower from being returned at once by the action of the weight, and allow sufficient time to re-fill the feed-box, the ratchet-wheel $z$ on the shaft $D'$, and pawl $z'$ on the bearing $D'''$, are thrown into or out of engagement, as desired, to lock or release said shaft and follower, as will be readily understood.

Having thus fully set forth my invention, what I claim as new, and desire to secure by Letters Patent, is—

1. In a machine for cutting excelsior, the combination of the cutting-wheel, the spurs or scorers,—the chair to which said scorers are attached, said chair being mounted in said wheel so as to oscillate and reciprocate therein, the spring actuated rods pivoted to the inner end of said chair said rods being loosely mounted in pivoted studs, whereby the centrifugal force in the spur-carrying chair is overcome, and said spurs are permitted to oscillate and reciprocate in said wheel.

2. In a machine for cutting excelsior, the combination of the cutting wheel, the circular head mounted in said wheel so as to oscillate the spur-carrying chair mounted in said head so as to reciprocate therein, said chair being provided with an anti-friction roller at each end, the fixed block receptacle, the opposite sides of which are traversed by said rollers as said wheel revolves, to actuate the scorers as specified.

3. In a machine for cutting excelsior, the combination of the revoluble cutting wheel, the spur-carrying chair mounted in said wheel so as to oscillate and reciprocate therein, the roller on each end of said chair, the spring actuated rods pivoted to said chair to overcome centrifugal force the fixed block receptacle, the curved arms extending therefrom, said arms adapted to engage said rollers on said chair and guide them so as to traverse the opposite sides of said receptacle, as specified.

4. In a machine for cutting excelsior, the combination of the revoluble cutting-wheel, the head mounted in said wheel so as to oscillate, the spur carrying chair mounted in said head so as to reciprocate therein, the friction roller on each end of said chair, the diverging spring actuated rods pivoted to the inner end of said chair and supported in swiveled studs, the fixed block receptacle adapted to be engaged by the rollers on said chair.

In testimony whereof I affix my signature in presence of two witnesses.

LOUIS J. WOHNLICH.

Witnesses:
E. S. WHEELER,
H. R. WHEELER.